Aug. 8, 1939.  C. SILVERMAN  2,168,687
COLLAR HOLDER
Filed Feb. 1, 1936
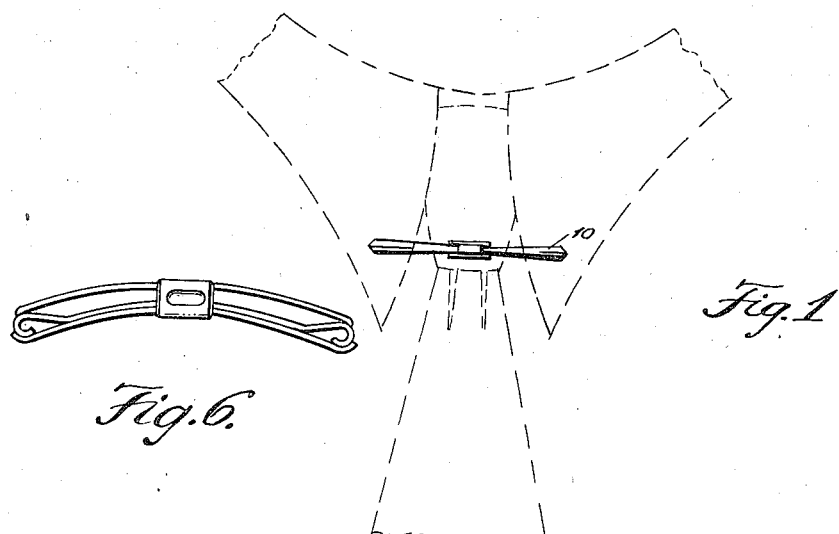
Fig. 1
Fig. 6.
Fig. 2
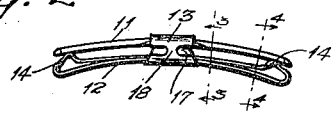
Fig. 7
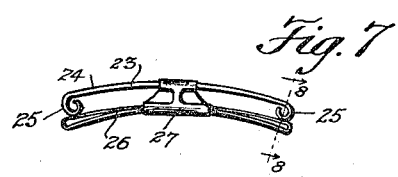
Fig. 3  Fig. 4
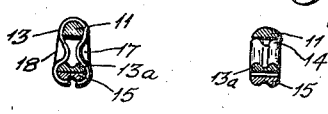
Fig. 8
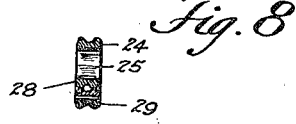
Fig. 5
Fig. 9
Fig. 10
Fig. 11
Inventor:
Charles Silverman
By Nathaniel Frucht
Attorney Patented Aug. 8, 1939

2,168,687

UNITED STATES PATENT OFFICE 2,168,687

COLLAR HOLDER

Charles Silverman, Providence, R. I.

Application February 1, 1936, Serial No. 61,899

2 Claims. (Cl. 24—81)

My present invention relates to the jewelry art, and has particular reference to collar holders and the like.

Collar holders of standard type include a front member and a rear member, the two members being resiliently urged towards each other at their ends, so as to present spaced jaws for detachably gripping collar tabs therebetween, one of the members being preferably made of resilient material. The gripping surface is preferably made of large area, in order to obtain an adequate locking action on the collar tabs without concentrating the pressure so as to produce indentations or the like in the collar tabs. However, it has been found difficult to provide a resilient member having a large engaging area and sufficient gripping action without substantial decrease in flexibility.

It is the principal object of my invention to devise a construction for a collar holder which provides a resilient gripping action having adequate strength and adequate flexibility.

It is a further object of my invention to provide a resilient member for a collar holder or the like which comprises separate elements cooperating to obtain the desired gripping action.

With the above and other objects and advantageous features in view, my invention consists of a novel arrangement of parts more fully disclosed in the detailed description following, in conjunction with the accompanying drawing, and more specifically defined in the claims appended thereto.

In the drawing,

Fig. 1 is a view showing the novel collar holder in use;

Fig. 2 is a side elevation of a preferred embodiment of my invention;

Fig. 3 is an enlarged section on the line 3—3 of Fig. 2;

Fig. 4 is an enlarged section on the line 4—4 of Fig. 2;

Fig. 5 is a side elevation of the resilient member;

Fig. 6 is a side elevation showing a modified construction;

Fig. 7 is a side elevation of a further modified construction;

Fig. 8 is a section on the line 8—8 of Fig. 7;

Fig. 9 is a side elevation of the resilient member of Fig. 7; and

Figs. 10 and 11 are respectively detail views of a modified construction and the contact blank therefor.

Referring to the drawing, the novel collar holder 10 comprises an upper arcuate member 11, preferably of bar metal, a lower resilient member 12, preferably of wire, and a central lock link 13; the lower member 12 is preferably formed of one piece of wire as shown in Fig. 5, and consists of upper elements 13a which are curved at the ends to provide bends 14, and a lower element 15 which is curved at its ends as at 16 to integrally join the wires 13a and cooperate therewith in forming the bend 14. The connector link 13, which is preferably of sheet metal or the like, is gripped along the centers of the members 11 and 12 so as to firmly position these members with the bends 14 normally resting against the underside of the upper member 11, the connector link being indented as indicated at 17 to leave central ribs 18 on each side which serve as strengthening ribs.

In the above described construction, the lower member 12 consists of two elongated elements which are independently resilient, but are integrally joined so as to exert a combined resilient action for pressing the bends 14 towards the upper member 11, whereby the collar tabs are locked in place by a relatively wide locking grip provided by a plurality of resilient members. The wires are attractively formed as double ridged, but may be of any configuration desired.

Instead of using two resilient members 13 and 15 which are integrally joined to provide bends 14, it is preferred for certain constructions to use independent resilient members 19 and 20, the member 19 having its ends curled or shaped as indicated at 21 to press against the underside of the upper member 11a, and the member 20 being positioned below the member 19 and having its ends 22 turned so as to press against the lower end of the turn 21, whereby both members cooperate to press the ends 21 into contact with the lower surface of the upper member 11a.

The above described constructions provide a collar holder having a slightly arcuate upper member which contacts the collar tabs. The upper member may be ornamental, as indicated in Fig. 7, the collar holder 23 having an upper member 24 with rounded ends 25, and a lower member 26, a connector link 27 similar to the connector link 13 being used. The lower member 26 is preferably made of a single piece of wire, see Fig. 9, having two upper elongated lengths 28 and a lower elongated length 29 which cooperates with the upper lengths to resiliently press the ends of the upper lengths against the rounded ends 25. A construction using two independent lengths, similar to that disclosed in Fig. 6, may be used if desired.

It is thus evident that the invention includes a plurality of coating resilient elements which function as a resilient member of a holding device; the invention may be applied to any holding device having two parts resiliently urged to grip a fabric or similar article therebetween.

A somewhat different arrangement is shown in Figs. 10 and 11, in which the front portion 30 has associated therewith a rear portion 31 which is formed of two resilient wires 32 and 33, the construction being similar to that disclosed in Fig. 9. A contact member 34 is mounted on each end of the upper wire 33, this contact member being formed as shown to provide an inclined slope 35 towards the center and an abrupt slope 36 towards the end, the contact blank having two depending sides 37 which fit over the upper wire 33 and are then bent around so as to lock the contact member 34 thereto while permitting sliding movement thereon. A back stop of any desired type is provided to prevent excessive inward movement of each contact member, as by striking up a portion of the upper wire. The resilient action of the two wires 32 and 33 and the spacing between the upper and lower portions, which increases slightly towards the center, permits an easy insertion of the collar tab between the contact member and the upper portion 30, the contact member sliding inwardly to facilitate the engagement; a greater resistance is interposed to withdrawing the collar tab, as the contact member slides outwardly, the space between the upper and lower portions decreasing slightly. Insertion of the collar tab is thus facilitated while withdrawal or slippage is rendered more difficult.

While I have described a specific constructional embodiment of my invention, it is obvious that changes in the materials used, in their dimensions, and in their forms, may be made to comply with the requirements for different holder designs, without departing from the spirit and the scope of the invention as defined in the appended claims.

I claim:

1. In combination, an elongated front member, an elongated rear member, and a connector securing said members at their centers, one of said members comprising two bars aligned with each other and with the other member, one bar having bends at its ends resiliently contacting said front member, and the other bar resiliently pressing against said first bar to retain it in contact with said front member.

2. In combination, an elongated front member, an elongated rear member, and a connector securing said members at their centers, one of said members comprising two bars aligned with each other and with the other member, one bar having bends at its ends resiliently contacting said front member, and the other bar resiliently pressing against the bent ends of said first bar to retain it in contact with said front member.

CHARLES SILVERMAN.